United States Patent
Chmielewski et al.

(10) Patent No.: US 8,260,345 B2
(45) Date of Patent: Sep. 4, 2012

(54) METHOD FOR CHANGING THE MOBILE NUMBER OF A WIRELESS COMMUNICATIONS DEVICE

(75) Inventors: Laura R Chmielewski, Huntington Woods, MI (US); Garett Gould, Troy, MI (US); Kevin Krause, Northville, MI (US); David Holt, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 1418 days.

(21) Appl. No.: 11/381,025

(22) Filed: May 1, 2006

(65) Prior Publication Data

US 2007/0254639 A1 Nov. 1, 2007

(51) Int. Cl.
*H04M 1/00* (2006.01)
(52) U.S. Cl. ............... 455/551; 455/419; 455/432.1
(58) Field of Classification Search .................. None
See application file for complete search history.

(56) References Cited

U.S. PATENT DOCUMENTS

| | | | | |
|---|---|---|---|---|
| 5,375,251 A * | 12/1994 | Pfundstein | ........... | 455/551 |
| 5,485,505 A * | 1/1996 | Norman et al. | ........... | 455/419 |
| 6,304,753 B1 * | 10/2001 | Hartmaier | ........... | 455/413 |
| 6,393,298 B1 * | 5/2002 | Fulton | ........... | 455/551 |
| 6,526,272 B1 * | 2/2003 | Bansal et al. | ........... | 455/406 |
| 6,529,727 B1 * | 3/2003 | Findikli et al. | ........... | 455/411 |
| 6,879,825 B1 * | 4/2005 | Daly | ........... | 455/419 |
| 7,266,371 B1 * | 9/2007 | Amin et al. | ........... | 455/419 |
| 7,305,090 B1 * | 12/2007 | Hayes et al. | ........... | 380/249 |
| 2004/0023647 A1 * | 2/2004 | Mazzara et al. | ........... | 455/419 |
| 2004/0023664 A1 * | 2/2004 | Mirouze et al. | ........... | 455/456.1 |
| 2004/0203691 A1 * | 10/2004 | Mazzara et al. | ........... | 455/419 |
| 2004/0203692 A1 * | 10/2004 | Schwinke et al. | ........... | 455/419 |
| 2005/0014481 A1 * | 1/2005 | Chin et al. | ........... | 455/403 |
| 2005/0153732 A1 * | 7/2005 | Stotelmyer et al. | ........... | 455/552.1 |
| 2005/0153741 A1 * | 7/2005 | Chen et al. | ........... | 455/558 |
| 2005/0287979 A1 * | 12/2005 | Rollender | ........... | 455/404.1 |
| 2006/0046745 A1 * | 3/2006 | Davidson | ........... | 455/456.4 |
| 2006/0052092 A1 * | 3/2006 | Schwinke et al. | ........... | 455/415 |
| 2006/0098690 A1 * | 5/2006 | Park | ........... | 370/503 |
| 2007/0167161 A1 * | 7/2007 | Cheng et al. | ........... | 455/435.1 |
| 2010/0120409 A1 * | 5/2010 | Shieh et al. | ........... | 455/419 |

\* cited by examiner

*Primary Examiner* — Lester Kincaid
*Assistant Examiner* — Mehmood B Khan
(74) *Attorney, Agent, or Firm* — Anthony L. Simon; Reising Ethington P.C.

(57) ABSTRACT

An automated method for remotely changing the mobile number (MDN or MIN) of a wireless communications device, such as a vehicle communications device capable of making hands-free calls. Generally, some wireless carriers do not allow multiple mobile numbers to be simultaneously activated to a single wireless communications device. Therefore, when a mobile number change request is made, the automated method determines what type of process is most appropriate for that change: an indirect change process that uses at least three mobile numbers (current, intermediate, and target numbers) and addresses the above-mentioned wireless carrier limitations, or a direct change process that uses only two mobile numbers (current and target numbers). In either case, a wireless data link is established between a call center and the vehicle communications device so that the remote number change can be performed.

17 Claims, 3 Drawing Sheets

METHOD FOR CHANGING THE MOBILE NUMBER OF A WIRELESS COMMUNICATIONS DEVICE

TECHNICAL FIELD

The present invention generally relates to a wireless communications system and, more particularly, to an automated method for remotely changing the mobile number of a wireless communications device, such as a vehicle communications device that enables hands-free calling while driving.

BACKGROUND OF THE INVENTION

Numerous types of wireless communications devices are used throughout the world each day, including devices such as cellular phones, pagers, personal digital assistants (PDAs), and vehicle communications devices.

Wireless communications networks generally utilize a multi-layered addressing system, similar to those used by computer networks, for identification and communication. For instance, a typical multi-layered addressing system utilizes at least two types of identifiers when communicating with a wireless device. The first identifier is an unchangeable, unique identification number that is usually embedded in the wireless device and is referred to as an Electronic Serial number (ESN). An ESN is oftentimes hard coded into the wireless device by the manufacturer, who ensures that no two devices have identical ESNs. The second identifier is an assignable mobile number, such as a Mobile directory number (MDN) or a Mobile Identification number (MIN), that is associated with a particular ESN and can be changed by a wireless carrier. Prior to the establishment of Wireless number Portability, the MDN and MIN were the same for many mobile phones, but now that MDNs can be ported or moved to other carriers, the MDN and MIN will be different for ported numbers.

Subscribers sometimes request a mobile number change for their wireless device so that it is local to their home location. Most often this means that the wireless device has a mobile number that uses the same area code and prefix as the subscriber's home telephone or cellular phone. Assigning a local number to the wireless device can have desirable effects, such as lowering potential long-distance charges, giving the subscriber a familiar and easy-to-remember phone number, and allowing a certain degree of personalization. As people move to different locations, change wireless carriers, or change hardware, they often require a new mobile number for their wireless device.

For certain wireless devices, such as cellular phones, pagers or PDAs, it is customary to bring the device into a store or service center so that a mobile number change can be performed on the premises. For other types of wireless equipment, such as a vehicle communications device, subscribers oftentimes want a remote mobile number change performed so that they do not have to bring the vehicle in. Remote mobile number changes are generally more difficult and complicated than those that are performed with physical access to the wireless device. Furthermore, the challenges associated with a remote mobile number change can be compounded when a wireless carrier utilizes a billing, routing or other sub-system that does not permit multiple mobile numbers of the same type to be assigned to a single ESN; that is, each ESN within a particular sub-system can only have a single MDN and a single MIN assigned to it.

SUMMARY OF THE INVENTION

According to one aspect of the present invention, there is provided an automated method for remotely changing the mobile number of a wireless communications device from a current number to a target number. The method generally comprises the steps of: (a) automatically determining whether a direct change process or an indirect change process should be used in order to perform the mobile number change, (b) if step (a) determines that a direct change process should be used, then automatically executing electronic instructions for a direct change, and (c) if step (a) determines that an indirect change process should be used, then automatically executing electronic instructions for an indirect change.

According to another aspect of the present invention, there is provided another automated method for remotely changing a mobile number of a wireless communications device from a current number to a target number. This method involves the use of a call center and a wireless carrier, and comprises the steps of: (a) automatically determining whether a direct change process or an indirect change process is needed in order to perform the mobile number change. If step (a) determines that a direct change process is needed, then: (i) using the wireless carrier to activate the target number and to deactivate the current number, and (ii) using the call center to establish a data link with the wireless communications device and to configure the wireless communications device with the target number. If step (a) determines that an indirect change process is needed, then: (i) using the wireless carrier to identify and activate an intermediate number, to deactivate the current number, to activate the target number, and to deactivate the intermediate number, and (ii) using the call center to establish a data link with the wireless communications device, to configure the wireless communications device with the intermediate number, and to configure the wireless communications device with the target number.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method disclosed herein is preferably used in conjunction with a vehicle communications device capable of making hands-free calls, such as the one described below, and enables a subscriber to remotely change the vehicle's mobile number without bringing the vehicle into a store or service center. In order to perform an automated remote mobile number change, a data link is preferably established and maintained between the vehicle communications device and a call center or another system back-end component. This allows the call center to assign a new mobile number to the vehicle communications device, while using the old mobile number to maintain the data link for communication therebetween. As mentioned above, some wireless carriers utilize billing or other sub-systems that do not permit multiple mobile numbers of the same type (MIN or MDN) to be assigned to a single ESN.

The method described below is capable of performing an automated remote mobile number change with such wireless carriers.

Figure 1:
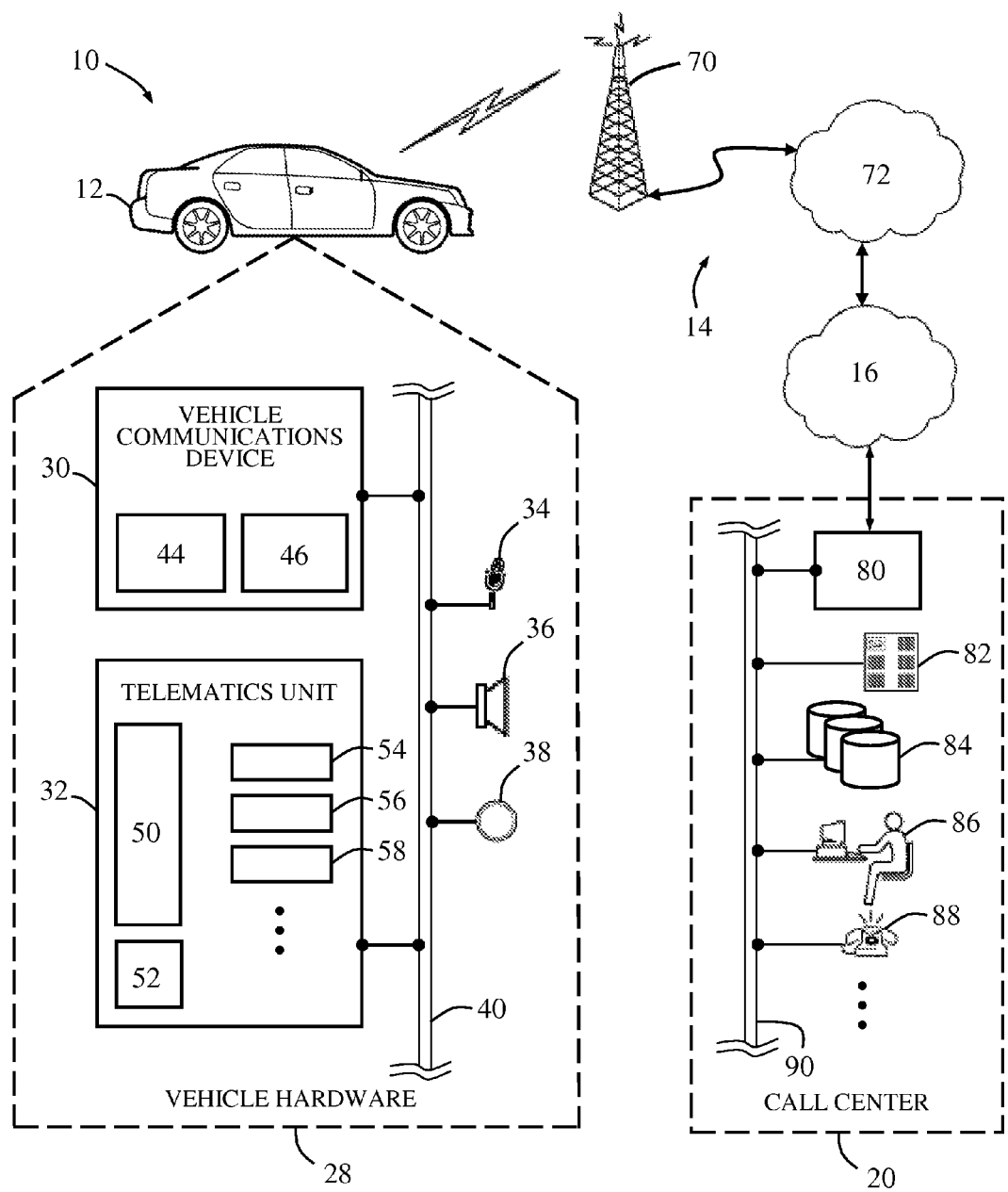
FIG. 1 is a block diagram depicting an exemplary embodiment of a communications system that is capable of utilizing the disclosed method.

With reference to FIG. 1, there is shown an example of a communication system 10 that may be used with the disclosed method and generally includes a vehicle 12, a wireless carrier system 14, a land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the present method as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a vehicle communication device 30, a telematics unit 32, a microphone 34, a speaker 36 and buttons and/or controls 38 that are interconnected using a network connection or bus 40. Examples of suitable network connections include a controller area network (CAN), a media oriented system transfer (MOST), a local interconnection network (LIN), an ethernet, and other appropriate connections such as those that conform with known ISO, SAE and IEEE standards and specifications, to name but a few.

Vehicle communication device 30 preferably uses radio transmissions to establish a voice channel with wireless carrier system 14 so that both voice and data transmissions can be sent and received over the voice channel. By providing both voice and data communication, vehicle communication device 30 enables the vehicle to offer a number of different services including those related to navigation, telephony, emergency assistance, diagnostics, infotainment, etc. According to one embodiment, vehicle communication device 30 includes a standard cellular chipset 44 for voice communications like hands-free calling, and a modem 46 for data transmission. In order to enable successful data transmission over the voice channel, modem 46 applies some type of encoding or modulation to convert the digital data so that it can communicate through a vocoder or speech codec incorporated in chipset 44. Any suitable encoding or modulation technique that provides an acceptable data rate and bit error rate can be used with the disclosed method. For a more complete discussion of an example of data transmission over a voice channel, please refer to U.S. patent application Ser. No. 11/163,579 filed Oct. 24, 2005, which is assigned to the present assignee and is hereby incorporated by reference.

Figure 2A:
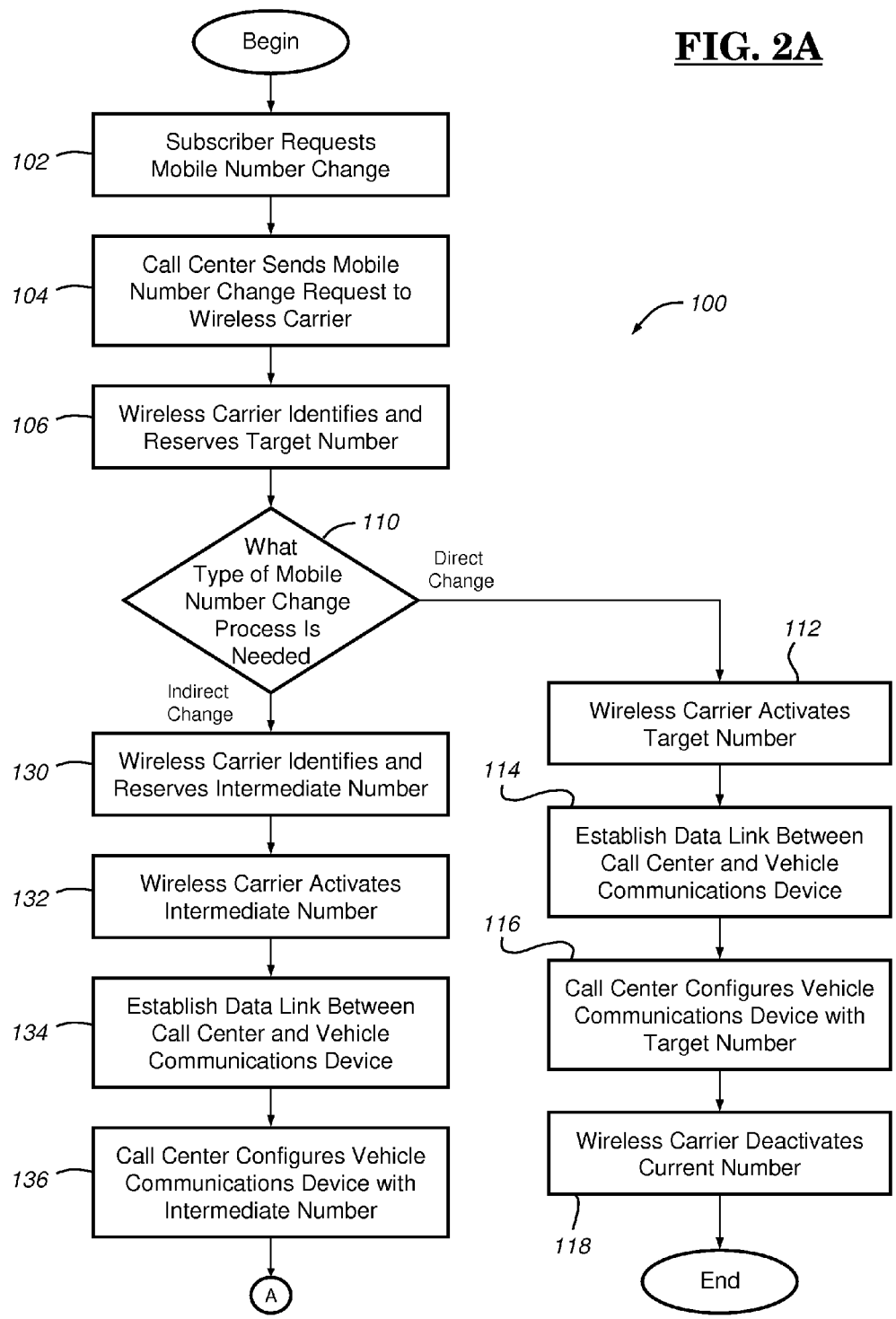
FIGS. 2A-B are a flowchart demonstrating an embodiment of an automated method for remotely changing the mobile number of a wireless device, in this case a vehicle communications device, without a wireless carrier or a call center having physical access to the device.
Figure 2B:
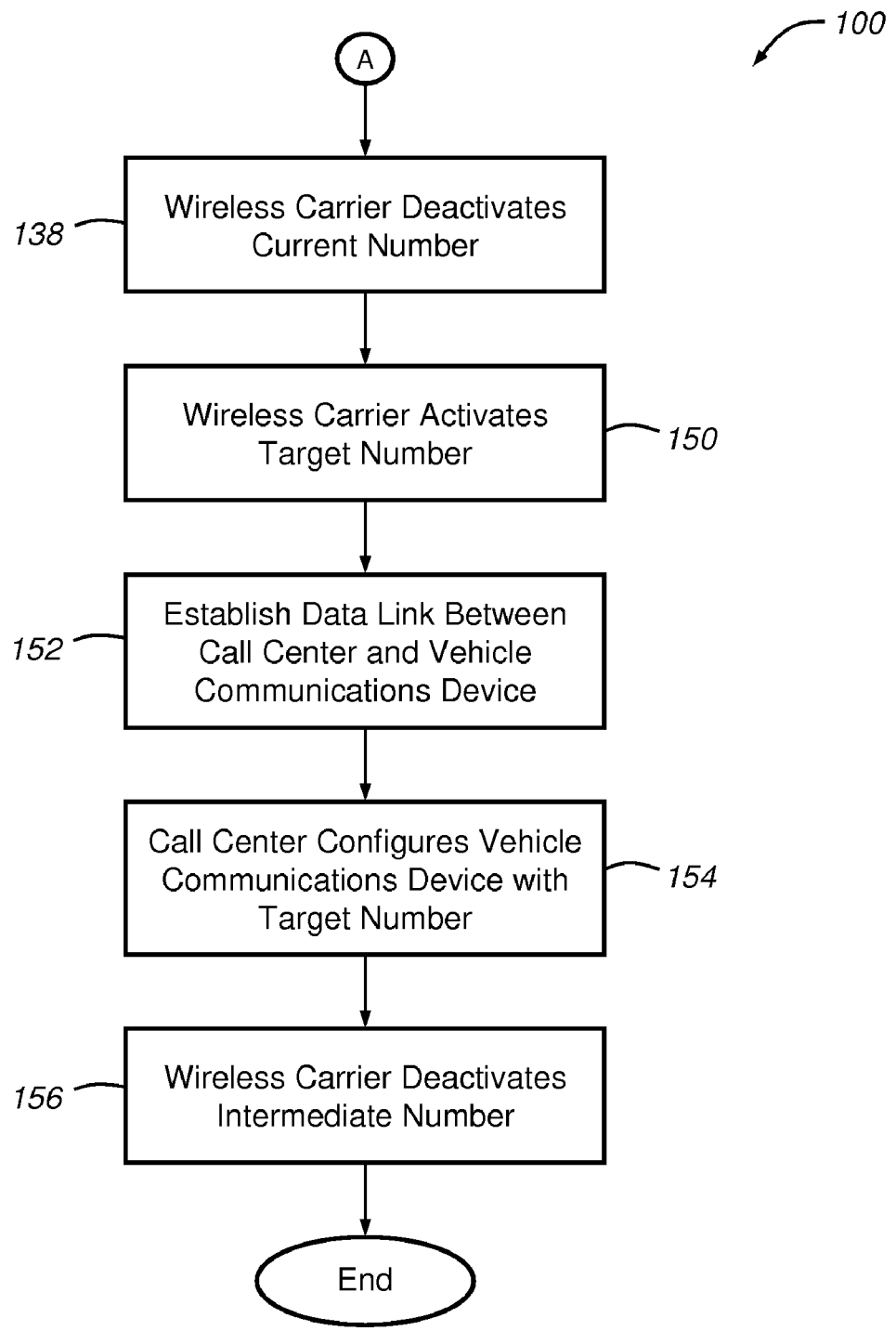

The telematics unit 32 is an onboard device that provides a variety of services through its communication with call center 20, and generally includes an electronic processing device 50, one or more types of electronic memory 52 and a number of function-specific devices or modules 54-58. The telematics unit 32 provides a variety of different services including, for example: turn-by-turn directions and other navigation-related services provided in conjunction with a GPS-based vehicle navigation unit 54; airbag deployment notification and other emergency or roadside assistance-related services provided in connection with various sensors 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable vehicle mounted telematics unit that can provide the above-identified services and that can be used to implement the method of FIG. 2 is known to those skilled in the art.

Microphone 34 provides the driver and other vehicle occupants with a hands-free input device and can be used in a number of different applications. For instance, when vehicle communications device 30 is being used as a cellular phone so that a vehicle occupant can have a conversation over communications system 10, one or more microphones 34 located around the vehicle interior receive the verbal statements of the occupant and transmit them through cellular chipset 44. Microphone 34 can also act as a hands-free input device for receiving verbal or other auditory commands, in which case the vehicle hardware could be equipped with an embedded voice processing unit utilizing human/machine interface (HMI) technology known in the art. Conversely, speaker 36 provides verbal output to the vehicle occupants and can either be a stand-alone speaker specifically dedicated for use with the vehicle hardware 28 or it can be part of the vehicle audio system. The vehicle hardware also includes one or more buttons or controls 38 for enabling a vehicle occupant to activate or engage one or more of the vehicle hardware components 28. For instance, button 38 can be an electronic push-button used to initiate voice communication with call center 20 or some other party.

Wireless carrier system 14 is preferably a cellular telephone system or any other suitable wireless system that transmits signals between the vehicle hardware 28 and land network 16. According to an exemplary embodiment, wireless carrier system 14 includes one or more cell towers 70, base stations and/or mobile switching centers (MSCs) 72, as well as any other networking components required to connect the wireless system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within a mobile switching center (MSC) or some other network component as well.

Land network 16 can be a conventional land-based telecommunications network that is connected to one or more landline telephones and connects wireless carrier network 14 to call center 20. For example, land network 16 can include a public switched telephone network (PSTN) and/or an Internet Protocol (IP) network, as is appreciated by those skilled in the art. Of course, one or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 20 need not be connected via land network 16, but could include wireless telephony equipment so that it can communicate directly with wireless network 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store subscriber profile records, subscriber behavioral patterns, or any other pertinent subscriber information. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Turning now to FIG. 2, there is shown an embodiment 100 of a method which performs an automated remote mobile number change for a wireless communications device, such as the vehicle communications device 30 previously described. As with other wireless communications devices, in order for device 30 to make and receive cellular calls, it must have a Mobile directory number (MDN), a Mobile Identification number (MIN), and an Electronic Serial number (ESN) registered with a wireless carrier. There are a number of reasons why a subscriber may want to change the MDN or why a wireless carrier may want to alter the MIN that has been assigned to a particular vehicle, as previously explained. Furthermore, it is usually inconvenient to require that the vehicle be brought to a store or service station, thus making remote mobile number changes desirable. Although the following exemplary description pertains to a method for changing the MDN at the request of the subscriber, it should be appreciated that the present method could also be used by the wireless carrier to change the MIN.

In order to perform the mobile number change disclosed herein, it is preferable that firmware, software or other electronic instructions embodying the steps shown in FIG. 2 are stored and executed by both the call center 20 and the wireless carrier. Beginning with step 102, a subscriber contacts the call center and requests a mobile number change, in this case an MDN change, through one of several methods. For instance, the subscriber can contact call center 20 via a landline or cellular phone, they can request an MDN change by visiting an affiliated website, or they can place a hands-free call to the call center through vehicle communications device 30.

Next, call center 20 establishes a data link with the wireless carrier and sends it a request for a mobile number change, step 104. In the example where a subscriber wants a local number for their vehicle, the request in step 104 is preferably an Activation request, which generally instructs the carrier to locate a mobile number that is local to the subscriber. To assist the wireless carrier in this, call center 20 provides some type of geographic indicator, such as the subscriber's home zip code or home area code/prefix, so that the carrier can identify a local number. In the United States, area codes and prefixes are obtained under the North American number Plan (NPA/NXX), but other numbering schemes in other countries can be used as well. In those instances where a subscriber simply wants to exchange the mobile number of their new vehicle with that of their old vehicle, the message in step 104 includes the old number instead of an Activation request.

Once the wireless carrier identifies a suitable and available mobile number, step 106 reserves that number as a target number so that it may not be given to another wireless device. As is appreciated by those skilled in the art, the actual process of identifying and selecting a mobile number may be performed by one of any number of different methods, and does not necessarily need to be carried out by the wireless carrier alone. For instance, the mobile number selection process could involve one or more communications back-and-forth between the call center and the wireless carrier so that the call center and/or subscriber have more input in the actual selection of the mobile number. The particular method used to identify and reserve the target number is largely dependent on the request that was made. For instance, if call center 20 sends a geographic indicator with the message in step 104, then the wireless carrier automatically searches for a target number that is local to that indicator. If, on the other hand, a subscriber wants to transfer an old mobile number to their current vehicle, then the wireless carrier simply uses that number as the target number. These exemplary methods for selecting a target number are only some of the available methods that could be used, as others also exist.

In step 110, the wireless carrier automatically determines which type of process is needed in order to accomplish the requested mobile number change: a direct change process or an indirect change process. A direct change is a process for changing mobile numbers that is generally used in instances where multiple MDNs or MINs can be simultaneously activated to the same ESN; put differently, the entire mobile number change process can be accomplished using only two numbers (the current number and the target number). An indirect change, on the other hand, is a somewhat more complicated process that is generally used in situations where the wireless carrier prohibits multiple MDNs or MINs from being simultaneously activated to a single ESN. For an indirect change, the wireless carrier must use at least three mobile numbers in order to complete the requested mobile number change (the current number, the target number, and at least one intermediate number).

According to one embodiment of step 110, the wireless carrier compares the billing system associated with the current number to that of the target number and, based on that comparison, makes a determination as to the type of process needed. For example, if a subscriber requests a target number that is serviced by the same wireless carrier as the current number (intra-carrier change) and that carrier uses a billing system that is not designed to support multiple MDNs simultaneously activated to the same ESN, then step 110 would determine that an indirect change is needed. Conversely, if the subscriber requests a target number that involves changing from a first carrier to a second carrier (inter-carrier change), then step 110 would decide that a direct change can be used to perform this transaction. This is because different carriers use different billing systems, thus, no one billing system is required to process multiple MDNs that are simultaneously activated to a single ESN. It should be recognized that these are only some of the methods available for determining when direct and indirect changes are needed, as the wireless carrier could use other techniques instead.

For example, if both the current and target numbers are serviced by a wireless carrier whose billing system accommodates multiple MDNs assigned to a single ESN, then step 110 would automatically determine that a direct change is most appropriate, even though this change is intra-carrier in nature. Furthermore, call center 20 could automatically include one or more flags, variables or other indicators in the message of step 104 in order to suggest a particular type of mobile number change process. This is especially true in instances where the call center is aware, before it even sends a mobile number change request, that a direct change will be sufficient for activating a particular target number. As an example of this technique, if the call center knows that all new vehicles are initially assigned a particular area code (such as a 1-500 area code) and that area code is serviced by a wireless carrier that is independent of the one used by the current number, then the call center could send a flag in step 104 indicting that a direct change process would suffice. This would save the wireless carrier time and processing resources when making the automated determination in step 110. Again, these are only some of the techniques available for evaluating step 110, as others could also be used.

If it is determined that a direct change should be performed, then the wireless carrier initiates this process by automatically executing software or other electronic instructions that activate the target number, step 112. Presumably, this process will be successful, as step 110 determined that two MDNs or MINs can be simultaneously activated to a single ESN. If it is not successful, then an error message is generated. Next, the wireless carrier sends a message to call center 20, preferably an Activation response message, instructing it to configure the vehicle communications device 30 with the newly activated target number.

In order to give the call center access to the vehicle communications device, a wireless data link must be established between them, step 114. The call center preferably uses the current number presently activated for the vehicle communications device to contact that device over a voice channel. This enables the call center to automatically configure the vehicle communications device with the new target number, step 116, while using the current number to maintain an uninterrupted connection therebetween. Unlike mobile number changes that occur when a cellular phone or other device is simply brought into a store and physically connected to a piece of equipment, a remote mobile number change is more challenging in that it requires a wireless data link during the process. Without the data link, call center 20 would be unable to configure vehicle communications device 30 with the new target number, as it would have no means for communicating with it. Of course, numerous other techniques, such as data communication over a data channel, are known in the art and could be used instead to create and maintain the data link.

Once the target number has been activated by the wireless carrier and configured by the call center, the call center sends an automated message back to the carrier instructing it to deactivate the old or current number, step 118. This deactivation causes the current number to be sent back to the pool of available phone numbers so that it may be used by another subscriber.

If an indirect change is required, then the wireless carrier automatically begins the indirect change process by running software or other electronic instructions that identify and reserve an available intermediate number, step 130. The intermediate number is a temporary number, in this case an MDN, that is selected because it is known to use a different, non-conflicting carrier than that used by either the current or target numbers. Once the intermediate number has been identified, the wireless carrier automatically activates that number, step 132, and sends an automated message to the call center alerting it of the activation. As before, this message is preferably in the form of an Activation response message.

Call center 20 establishes a wireless data link with vehicle communications device 30, step 134, in the same manner as previously described. With this data link in place, the call center automatically configures the vehicle communications device with the intermediate number, step 136. At this point, the vehicle communication device's ESN has two mobile numbers associated with it; the old current number and the new intermediate number. Following successful configuration of the intermediate number, the call center sends an automated confirmation message back to the wireless carrier which causes it to deactivate the current number, step 138, thus making it available for other subscribers.

A similar process to that described in steps 132-138 is then repeated, but instead involves the automatic activation of the target number and deactivation of the intermediate number. In step 150, the wireless carrier activates the previously reserved target number and sends an automated Activation response message back to the call center. Receipt of this message causes the call center to establish a wireless data link with the vehicle communications device using the intermediate number, step 152. This data link may still be present from step 134, or it may be reestablished here. As before, call center 20 then configures vehicle communications device 30 over the data link, step 154, but this time the device is configured with the new target number. Upon successful configuration, the call center sends an automated message to the wireless carrier so that it can deactivate the intermediate number and return it to the group of available mobile numbers, step 156.

The automated remote mobile number change process described above can of course include a variety of other features. For instance, the process could include one or more steps for sending the subscriber automated or manual messages, confirmations, status updates, time estimates for how long it will take to perform the mobile number change, etc. Furthermore, method 100 could be reconfigured to use reiterative loops and flags, counters, variables, etc., as appreciated by those skilled in the art. For example, instead of having a continuous sequence of eight steps in a row (132-138 and 150-156), these steps could be reduced to a single four-step loop that is executed two separate times, depending on the status of certain flags, etc.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, even though the mobile number change process disclosed above is fully automated, various manual steps could be used in addition to or in lieu of those described above. Also, the particular order of the various processing steps could differ from the exemplary sequence presented above. It is also possible for the data link described above to be established between the wireless carrier and the vehicle communications device, instead of between the call center and the vehicle. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An automated method for remotely changing the mobile number of a wireless communications device, wherein said method changes the mobile number from a current number to a target number and comprises the steps of:
   (a) automatically selecting between a direct change process and an indirect change process in order to perform the mobile number change;
   (b) when the direct change process is selected, then automatically executing electronic instructions for a direct change that:
   (i) activate the target number, (ii) establish a data link with the wireless communications device, (iii) configure the wireless communications device with the target number, and (iv) deactivate the current number;
   (c) when the indirect change process is selected, then automatically executing electronic instructions for an indirect change that: (i) identify and activate an intermediate number, (ii) establish a data link with the wireless communications device, (iii) configure the wireless communications device with the intermediate number, (iv) deactivate the current number, (v) activate the target number, (vi) configure the wireless communications device with the target number, and (vii) deactivate the intermediate number;
   wherein step (a) further includes at least one of the following sub-steps: (i) determining when the requested mobile number change involves an intra-carrier exchange or an inter-carrier exchange, (ii) determining when the wireless carrier that services the current number or that which services the target number accommodates multiple mobile numbers simultaneously activated to a single Electronic Serial number (ESN), or (iii) reviewing the status of a flag, variable or other indicator suggesting a type of mobile number change process.

2. The method of claim 1, wherein the wireless communications device is a vehicle communications device that operates in connection with one or more speaker(s) and microphone(s) to provide hands-free calling for a vehicle occupant.

3. The method of claim 1, wherein the mobile number is a Mobile directory number (MDN) and said method is performed in response to a request from either a subscriber or a wireless carrier.

4. The method of claim 1, wherein the mobile number is a Mobile Identification number (MIN) and said method is performed in response to a request from a wireless carrier.

5. The method of claim 1, wherein said method further includes automatically selecting the target number based on a geographic indicator.

6. The method of claim 1, wherein sub-steps (i) and (iv) of step (b) are performed by a wireless carrier, and sub-steps (ii) and (iii) are performed by a call center.

7. The method of claim 1, wherein sub-steps (i), (iv), (v) and (vii) of step (c) are performed by a wireless carrier, and sub-steps (ii), (iii) and (vi) are performed by a call center.

8. The method of claim 1, wherein the data link is provided over a voice channel established between the wireless communications device and a call center.

9. The method of claim 1, wherein sub-steps (i) of step (b) and (i) and (v) of step (c) cause multiple mobile numbers to be simultaneously activated to a single Electronic Serial number (ESN).

10. The method of claim 1, wherein sub-step (iii) of steps (b) and (c) are performed over a wireless data link that is established using the current number.

11. The method of claim 10, wherein sub-step (vi) of step (c) is performed over a wireless data link that is established using the intermediate number.

12. An automated method for remotely changing a mobile number of a wireless communications device from a current number to a target number, wherein said method involves the use of a call center and a wireless carrier and comprises the steps of:
   (a) automatically selecting between a direct change process and an indirect change process in order to perform the mobile number change;
   (b) when step (a) selects the direct change process, then: (i) using the wireless carrier to activate the target number and to deactivate the current number, and (ii) using the call center to establish a data link with the wireless communications device and to configure the wireless communications device with the target number;
   (c) when step (a), selects the indirect change process, then: (i) using the wireless carrier to identify an intermediate number available for use, to activate the intermediate number, to deactivate the current number, to activate the target number, and to deactivate the intermediate number, and (ii) using the call center to establish a data link with the wireless communications device, to configure the wireless communications device with the intermediate number, and to configure the wireless communications device with the target number;
   wherein step (a) further includes at least one of the following sub-steps: (i) determining when the requested mobile number change involves an intra-carrier exchange or an inter-carrier exchange, (ii) determining when the wireless carrier that services the current number or that which services the target number accommodates multiple mobile numbers simultaneously activated to a single Electronic Serial number (ESN), or (iii) reviewing the status of a flag, variable or other indicator suggesting a type of mobile number change process.

13. The method of claim 12, wherein the wireless communications device is a vehicle communications device that operates in connection with one or more speaker(s) and microphone(s) to provide hands-free calling for a vehicle occupant.

14. The method of claim 12, wherein the mobile number is a Mobile directory number (MDN) and said method is performed in response to a request from a subscriber.

15. The method of claim 12, wherein the mobile number is a Mobile Identification number (MIN) and said method is performed in response to a request from a wireless carrier.

16. The method of claim 12, wherein said method further includes automatically selecting the target number based on a geographic indicator.

17. The method of claim 12, wherein the data link is provided over a voice channel established between the wireless communications device and the call center.

* * * * *